Oct. 16, 1956  J. H. WILLIAMS  2,766,613
UNION TESTER
Filed Jan. 27, 1953  6 Sheets-Sheet 1
FIG. I
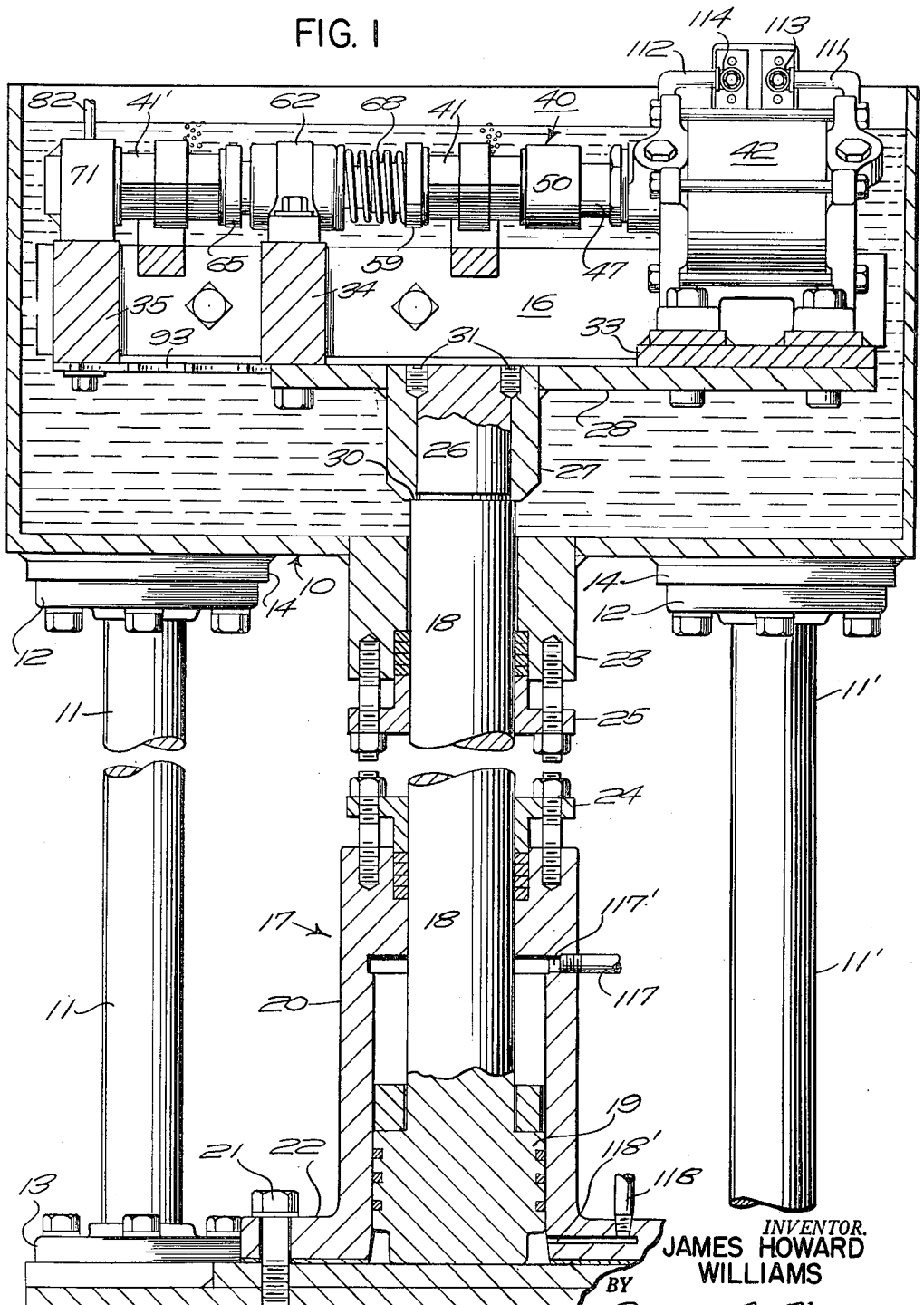
INVENTOR.
JAMES HOWARD WILLIAMS
BY
David D. McKenney
ATTORNEY

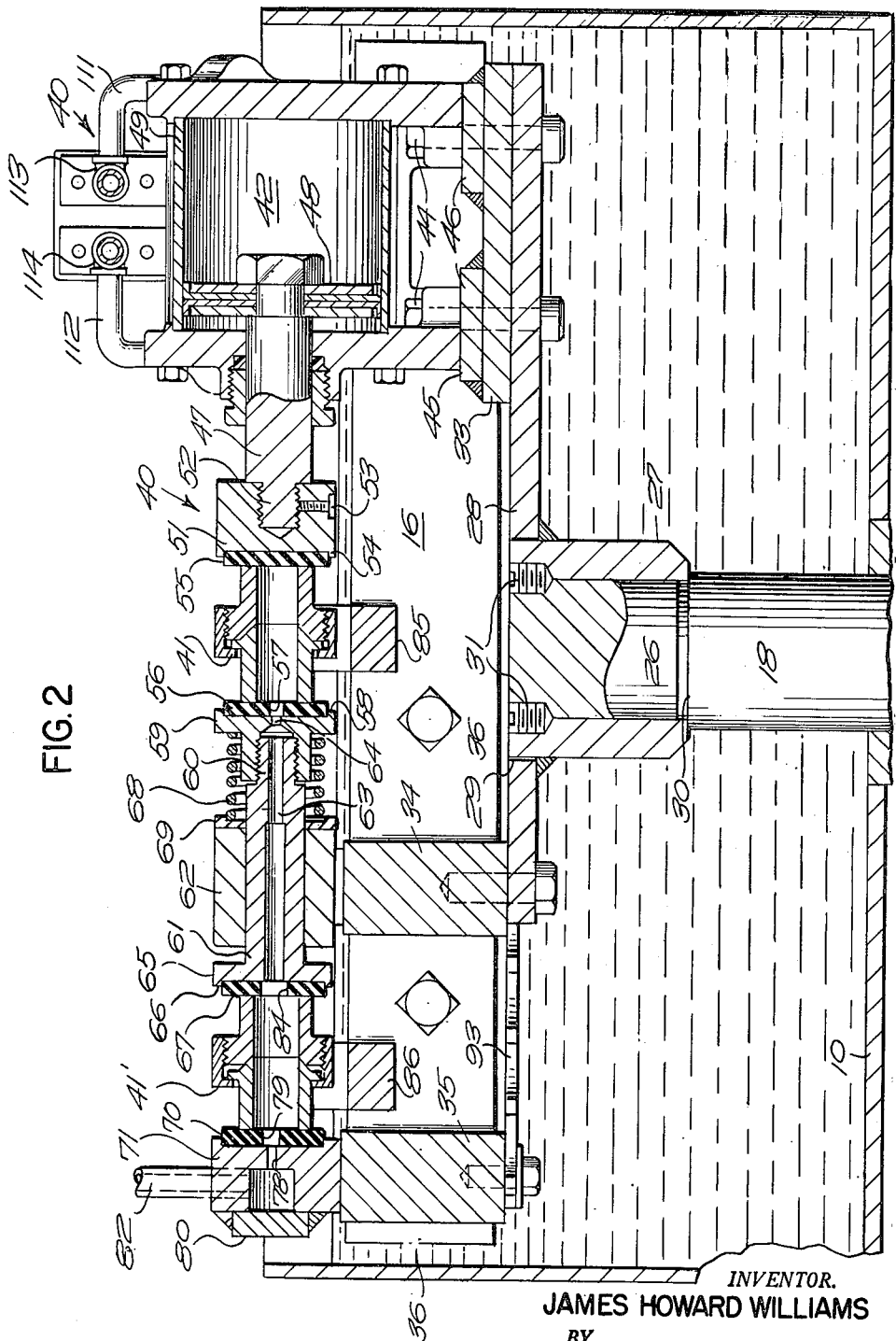

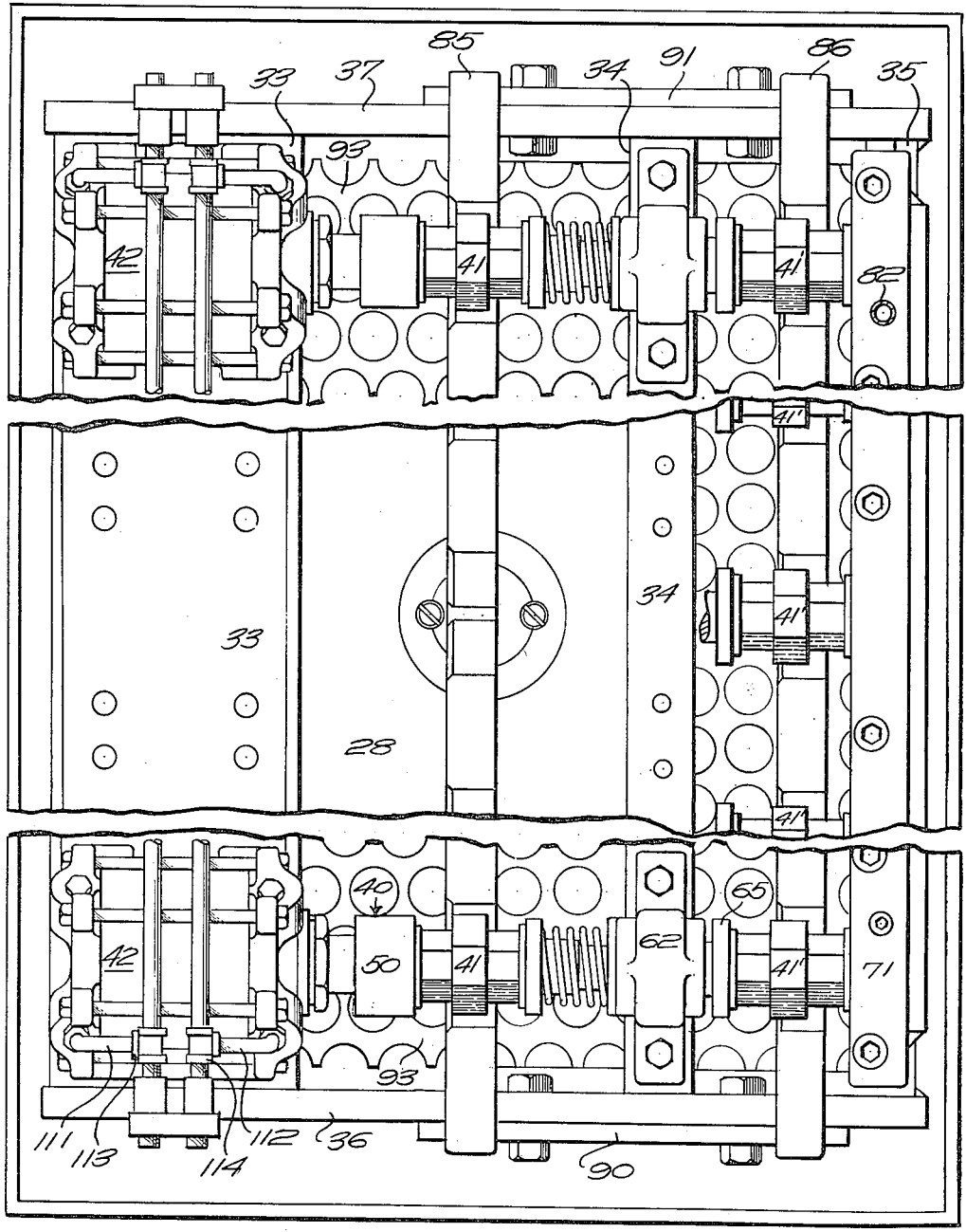

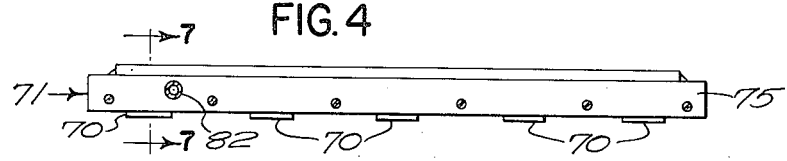
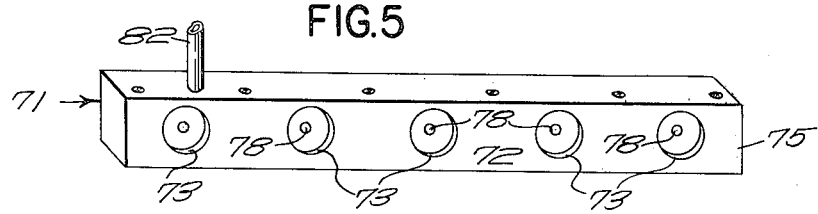
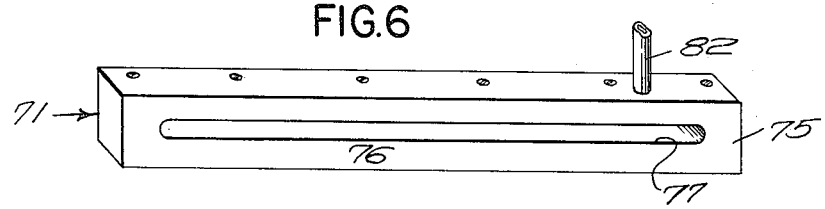
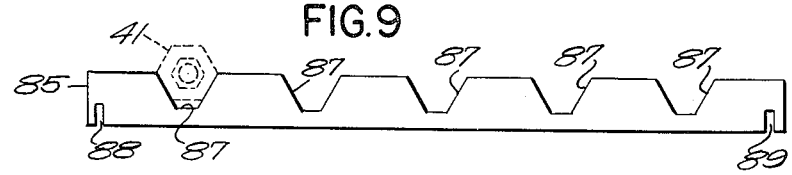
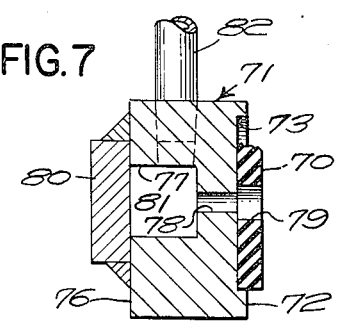
INVENTOR.
JAMES HOWARD WILLIAMS
BY
David D. McKenney
ATTORNEY INVENTOR.
JAMES HOWARD WILLIAMS
BY David D. McKenney
ATTORNEY

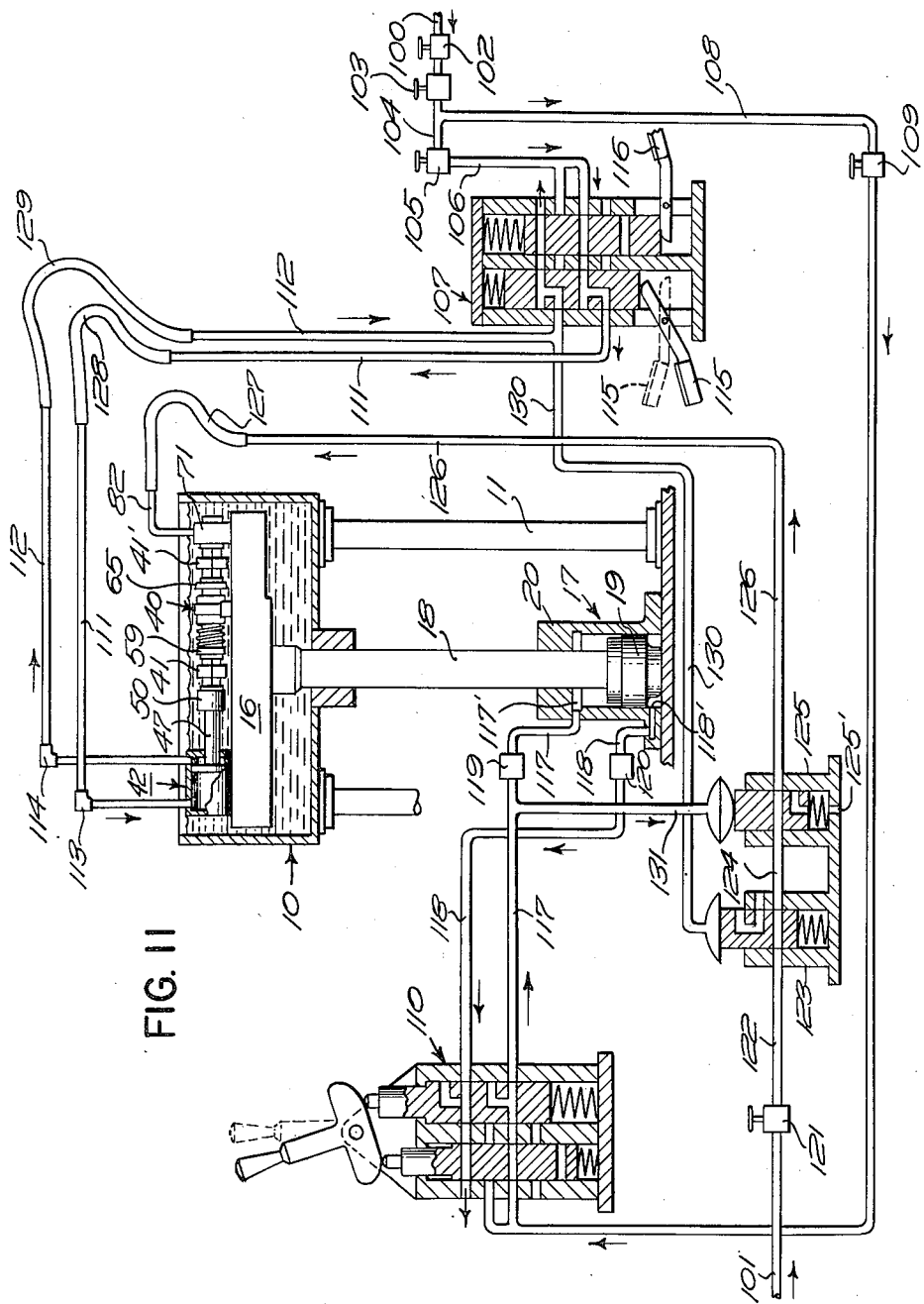

United States Patent Office 2,766,613
Patented Oct. 16, 1956

2,766,613

UNION TESTER

James Howard Williams, Lincoln, R. I., assignor to Grinnell Corporation, Providence, R. I., a corporation of Delaware Application January 27, 1953, Serial No. 333,587

11 Claims. (Cl. 73—45.5)

This invention relates to testing apparatus for unions. More especially, it has to do with apparatus for testing a large number of unions simultaneously by forcibly submerging them in a bath of a clear liquid and introducing compressed air into them while submerged so that it may be determined readily from the presence or absence of rising air bubbles whether or not the unions are imperfectly made and therefore will leak when they are installed in a piping system filled with a fluid under considerable pressure.

Unions are pipe fittings which are used in plumbing for connecting or coupling together the ends of two adjacent pieces of pipe, or a pipe and a fitting, to facilitate connection or disconnection of these parts without disturbing the pipes or fittings themselves. Unions usually are classified as nut unions and flange unions. The apparatus of the present invention is concerned more particularly with the testing of unions of the former type.

Nut unions as commonly made consist mainly of three pieces, viz. a pair of short tubular members having their outwardly disposed ends threaded either internally or externally for American Standard pipe threads to receive the end of a pipe or a fitting, and a locking nut or collar by which the adjacent tubular sections are held together in axially aligned relation end-to-end with their inner ends in abutting relation. The edge of the inner end of one of the tubular members is tapered to fit slightly into the end of the second short tubular member which is beveled to receive it. These tapered and beveled portions of the tubular members are machined surfaces and when held tightly together by means of the locking collar or nut, which fits around them where they abut, they form a fluid-tight seal. Such unions are usually installed in piping systems which carry fluids under pressure so that it is extremely desirable to test each of these unions after it is made to determine whether or not it is fluid-tight. As far as I am aware, it has been the practice in the past to test these unions on an immersion device which accommodates only one union at a time and in which the union to be tested is moved into and out of the water bath manually.

It is accordingly one object of the present invention to provide simple but effective apparatus for readily determining whether or not a union is fluid-tight.

Another object of the invention is to provide an apparatus for testing a relatively large number of unions simultaneously at a single immersion in a liquid bath.

Another object of the invention is to provide a union testing apparatus of the above type wherein the unions under test are held in place by fluid pressure responsive clamping means and they are submerged in or raised from the liquid bath in the tank by a fluid pressure actuated means.

Still another object of the invention is to provide an apparatus adaptable for testing a number of unions in groups of different sizes wherein the supporting means for the unions may be easily and quickly exchanged for another which will accommodate a like number of unions of a different size.

A further object of the invention is to provide a union testing apparatus wherein any unions which may be inadvertently dropped into the liquid tank by the operator while installing them or removing them from a testing position may be easily and readily retrieved.

A still further object of the invention is to provide a union testing apparatus of the above type wherein the fluid pressure system includes valves and controls which would make it impossible to introduce air under pressure into the interiors of the unions to be tested until they have been securely clamped in place and are ready to be submerged in the tank bath, and also which would make it impossible to unclamp the unions while they have air under pressure therein.

The best mode in which it has been contemplated to apply the present improvements of my invention is shown in the accompanying drawings, but these are to be deemed merely illustrative, for it is intended that the patent shall cover, by suitable expression in the appended claims, whatever features of patentable novelty exist in the invention herein disclosed.

In the drawings:

Fig. 1 is a fragmentary view partly in vertical section and partly in elevation showing my novel testing apparatus in use;

Fig. 2 is a view in vertical section, on enlarged scale, of the tank and the movable frame unit therein illustrated in Fig. 1 but here shown in raised position out of the liquid bath in the tank and with two unions to be tested clamped in place in one of the fluid pressure actuated testing mechanisms carried by the frame unit just prior to being submerged in the liquid bath;

Fig. 3 is a fragmentary plan view of the testing apparatus shown in Fig. 1;

Fig. 4 is a plan view of the manifold unit;

Fig. 5 is a side view of the manifold unit of Fig. 4 showing the cups for accommodating the annular pads which seal the adjacent pipe ends of the unions under test;

Fig. 6 is a view of the recessed side of the manifold unit opposed to that shown in Fig. 5;

Fig. 7 is an enlarged vertical section taken on the line 7—7 of Fig. 4 looking in the direction of the arrows;

Fig. 8 is a top plan view of one of the V-notched bar members for supporting the unions in position prior to being clamped;

Fig. 9 is a side elevation of the V-notched bar member shown in Fig. 8 with a union being depicted in broken outline in one of the V-notches;

Figure 10:
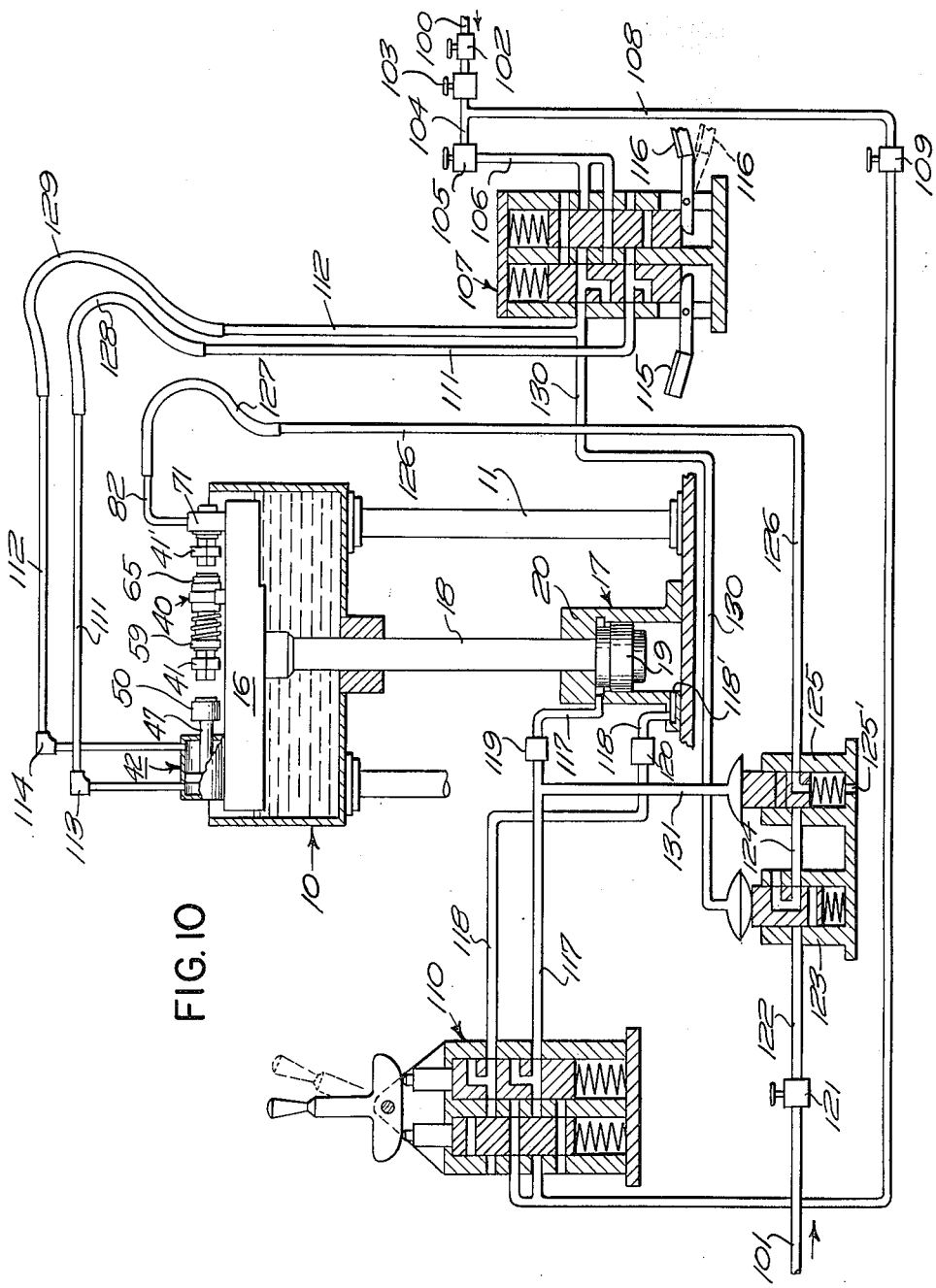

Fig. 10 is a diagrammatic representation of the testing apparatus of the present invention with the movable frame unit in raised position out of the tank and showing a pair of unions to be tested in place, but not clamped, preparatory to their being submerged in the bath and with the elevating plunger, the various control valves and other elements of the system in readiness for operation; and Fig. 11 diagrammatically represents the testing apparatus with the movable frame unit lowered in the tank and the fluid pressure actuated testing mechanism carrying the unions under test submerged in the liquid bath, and showing the positions of the valves and other movable elements assumed during the testing operation as well as the direction of flow of fluid pressure in the pipe lines.

Referring now more particularly to the drawings, the improved testing apparatus of this invention includes an open metal tank 10 which stands upon the floor and is supported at a desired working height above the floor by columns 11 carrying at their upper and lower ends suitable flanged fittings 12 and 13 respectively which are bolted to suitable bottom pads 14 of the tank 10 and to a laminated base plate 15 respectively. The tank 10 is preferably rectangular in shape and may be filled to any desired depth with a clear liquid, preferably oil or any other liquid having rust-preventing properties, and suitable for use as a testing bath for indicating leaks at the joints of unions under test by bubbles arising therefrom when the unions are supplied interiorly with gas under pressure, usually compressed air, while submerged in such liquid in the tank.

Located in the tank 10 is a vertically movable frame unit 16 which is generally rectangular in shape and carries the testing mechanisms and means, hereinafter to be described in detail, for holding the individual unions under test and sealing their pipe ends while supplying air under pressure to the interiors of the unions during testing.

The frame unit 16 is lowered and raised vertically in and out of the liquid in the tank 10 by fluid pressure operated means which is here shown as a piston-cylinder unit 17 situated beneath the tank 10 and consisting of a vertically reciprocable piston rod 18 having its driving piston 19 slidably mounted in a vertical cylinder 20 of the double-acting type. The cylinder 20 is centrally located on the base plate 15 and is secured thereto by means of suitable bolts 21 which pass through suitable holes in an outwardly projecting flange 22 integral with the lower end of the cylinder 20. As illustrated the piston rod 18 extends outwardly and vertically upwardly from the cylinder 20 and has its upper end projecting well into the interior of the tank 10 after passing freely through a depending sleeve insert 23 which is disposed centrally of the bottom of the tank and welded thereto. Leakage around the sliding piston rod 18 at the respective entrances of the cylinder 20 and the sleeve insert 23 is prevented by the provision of suitable packing glands 24 and 25 respectively which may be of a conventional construction and well known in the art.

The upper end of the piston rod 18, projecting into the tank 10 has its diameter reduced slightly to form a neck 26 which fits into the bore of a short depending cylindrical sleeve insert 27 welded at its rim to the underside of the horizontal bed plate 28 of the vertically movable frame unit 16. The bed plate 28 is of rectangular shape and provided with a suitable hole 29 located equidistant from the longer sides thereof, but closer to one end than the other, into which is inserted the upper end of the sleeve insert 27 so that its upper end face terminates flush with the top of the bed plate. The lower end of the sleeve insert 27 abuts against the shoulder 30 resulting at juncture of the upper part of the piston rod with the neck 26 whereby the weight of the vertically movable frame unit 16 is communicated through the sleeve insert 27 to the piston rod 18 and thus wholly supported thereby. Rotation of the movable frame unit 16 on the neck 26 of the piston rod 18 is prevented by socket-type pipe plugs 31 located in suitable threaded holes which extend inwardly from the top end of the piston rod with their axes parallel to that of the piston rod and formed half in the contiguous faces of the neck 26 and the sleeve insert 27 respectively. It will be apparent from the foregoing arrangement that if the piston rod 18 is actuated upward or downward by corresponding movement of the piston 19 in the cylinder 20 when fluid pressure is introduced thereto, the movable frame unit 16 will be lowered or raised in the tank depending on whether fluid pressure is introduced into the cylinder 20 above or below the piston 19. The particular fluid pressure system for controlling the operation of the piston 19 will be described hereinafter in considerable detail.

The vertically movable frame unit 16 is in the general form of a partial grating and includes in its structure, in addition to the rectangular shaped bed plate 28 above mentioned, a longitudinally extending rectangular cross-plate 33 and two longitudinally extending cross-bars 34 and 35, all parallel to each other with respect to their longitudinal axes. The cross-plate 33 and the cross-bar 34 are positioned at opposite ends of the bed plate 28 and bolted to the top side thereof, the cross-plate 33 being attached to the extended end of the bed plate farthest removed from the cylindrical sleeve insert 27. The cross-plate 33 and the cross-bar 34, as thus arranged on the bed plate 28, project at each end beyond the longer sides of the latter and have their respective longitudinal axes disposed at substantially right angles to that of the bed plate 28. Extending across and welded to the projecting ends of the cross-plate 33 and the ends of the cross-bar 34 are end plates 36 and 37 respectively, one on either side of the rectangular bed plate 28 and parallel to the longer sides thereof. As shown in Figs. 1 and 2, these end plates extend beyond their connection with the cross-bar 34 and have extending across and welded to the end extremities of these extensions the second cross-bar 35 above mentioned.

The parts of the vertically movable frame unit 16 thus far described provide the supporting structure on which are mounted in spaced parallel rows a number of identical fluid pressure actuated testing mechanisms 40 which serve to apply clamping pressure for holding a pair of unions 41 and 41' firmly and sealing their pipe ends during testing while at the same time introducing compressed air into the interiors thereof for testing purposes. Five such mechanisms are utilized in the present apparatus of which two complete units only are here shown in Fig. 3 of the drawings, but since they are identical in structure and operation it is believed that a description of one such mechanism will suffice for the others.

Each fluid pressure actuated testing mechanism 40 comprises a small piston-cylinder unit here indicated generally at 42 mounted on the cross-plate 33 and rigidly secured thereto by suitable bolts 44 of which several also serve to fasten together the cross-plate 33 and the bed plate 28. Interposed between the piston-cylinder unit 42 and the cross-plate 33 and welded to the latter are suitable spacer plates 45 and 46 which serve to locate the piston-cylinder unit 42 at the proper elevation and in axial alignment with respect to the other parts of the testing mechanism which will be described presently.

Each piston-cylinder unit 42 consists of a short piston rod 47 having at one end a piston 48 slidably mounted in a double-acting cylinder 49 which has its axis parallel to the longitudinal axes of the end plates 36 and 37. The piston rod 47 extends from one end of the cylinder 49 and carries at its outer end a clamping head 50 in the form of a cylindrical block 51 which has screw-threaded connection on the externally threaded reduced outer end portion of the piston rod, as indicated at 52 in Fig. 2. A locking screw 53 tightly secures the clamping block 51 to this reduced end of piston rod 17 against inadvertent rotation thereon. The outer end face of the clamping block 51 is cupped, as indicated at 54, and projecting outwardly therefrom is a compressible circular pad 55, which is preferably of rubber, and against which one of the pipe ends of a union 41 to be tested is held firmly and sealed during the testing operation when fluid pressure is introduced into the piston-cylinder unit 42 to move the clamping block toward the union. In turn, the force of the piston-cylinder unit 42 holds the other pipe end of the union 41 to be tested firmly against and sealed by an annular rubber pad 56 having a central aperture 57 and associated with the cupped end face 58 of an annular clamping head 59 which has screw-threaded connection on the externally threaded reduced end portion 60 of a hollow spindle 61. The spindle 61 is arranged with its longitudinal axis substantially aligned with that of the piston rod 47 and is slidably mounted in a suitable bore in a bearing block 62 which is bolted to the first mentioned cross-bar 34 (see Fig. 1). The spindle has a stepped cylindrical bore therethrough as indicated at 63 which communicates with a central hole 64 in the clamping head 59. As illustrated, the spindle is considerably longer than the bearing block 62 so that it projects therefrom at both ends, one of which is reduced and has threaded connection with the clamping head 59 above mentioned while the other end has integral therewith an annular clamping head 65 whose end face 66 is cupped and provided with an annular rubber pad 67.

A compression spring 68 including a suitable spring retaining cupped washer 69 at one end encircles the projecting portion of the spindle 61 on which the clamping head 59 is carried and normally tends to urge the head 59 in an axial direction toward the opposed end of the clamping head 50 to hold the clamping head 65 abutted against the bearing block 62. Thus, with the clamping head 50 retracted by the piston-cylinder unit 42, ample space remains between the clamping heads 65 and 71, and 51 and 59 for the insertion of the unions to be tested. Upon operation of the piston cylinder unit, the relationship is changed, the spindle 61 being moved in opposition to the spring 68 and the unions 41 and 41' thereby being clamped between the clamping heads. The inner side face 72 of the manifold unit 71 is provided at spaced intervals along its length with a series of circularly recessed portions 73 (see Fig. 5) individually accommodating one of the rubber pads 70 which is located directly opposite to the end of the above described clamping head 65 and the rubber pad 67 thereon.

The air supply manifold unit 71 is affixed to the top of the cross-bar 35 and, as here shown, is in the form of a hollow rectangular bar-shaped member 75 whose outer side face 76 is formed with a central elongated recess 77 which extends inwardly from this side face to a depth beyond the center of the bar member and terminates in its longitudinal extent short of the ends thereof. The circularly recessed portions 73 at the side face 72 each is provided centrally thereof with a lateral port 78 which communicates with the recess 77 of the manifold unit, and these ports 78 have their respective axes coaxial with the central holes 79 of the annular rubber pads 70 to provide for passage of compressed air therethrough into the unions 41 and 41' under test from the manifold unit, as will be hereinafter described. Welded to the outer side face 76 of the bar member 75 is a seal plate 80 which covers the open side of the recess 77 and forms therewith the closed air-loaded chamber 81 of the manifold unit 71 (see Fig. 7).

During the testing operation a union 41 is interposed between the imperforate rubber pad 55 at the end of the piston rod 47 and the annular rubber pad 56 carried by the clamping head 59 and a second union 41' is placed between the annular rubber pad 67 on the clamping head 65 of the spindle 61 and the opposing annular rubber pad 70 on the air supply manifold unit 71. When these unions are in place and air pressure is introduced into the piston-cylinder unit 42, to effect appropriate movement of the piston rod 47 and the clamping head 50 away from said piston-cylinder unit, the first mentioned union 41 will be held firmly clamped between the pads 55 and 56 at the respective ends thereof. Continued extension of the piston rod 47 from the cylinder 49 thereafter serves to compress the spring 68 and force the spindle 61 to slide axially in its bearing block 62 toward the air supply manifold unit 71, as depicted in Fig. 2, thereby clamping the second union 41' to be tested between the pads 67 and 70 at the respective ends thereof. Compressed air is introduced into the chamber 81 through a suitable pipe connection 82 in the top of the manifold unit 71, and this air under pressure in the manifold chamber 81 passes therefrom through ports 78 and the holes 79 in the bar member 75 and the circular pads 70 respectively into the interior of the union 41' which is interposed between the pads 67 and 70 of the clamping head 65 and the manifold unit 71 respectively and clamped in place by the clamping pressure of the piston rod 47. From the union 41' the compressed air charge passes through the central hole 84, thence through the stepped cylindrical bore 63 in the spindle 61 and the center holes 64 and 57 of the head 59 and the pad 56 respectively into the interior of the first union 41 held firmly in place by the clamping heads 50 and 59.

Means are provided to facilitate the proper positioning and supporting of the unions 41 and 41' between the respective sets of rubber pads preparatory to their being firmly clamped thereagainst during testing comprising the demountable bar members 85 and 86 (see Fig. 3) which extend crosswise of the frame unit 16 one interposed between the clamping heads 50 and 59 and the other between the clamping head 65 and the manifold unit 71. These bar members are identical in their structure, each being constructed as shown in Figs. 8 and 9 with a series of generally V-shaped notches 87 in the upper edge thereof in which are placed the usual hexagonal locking nuts or collars of the unions preliminary to their being firmly clamped in a testing position. The V-notched bar members 85 and 86 are arranged parallel to the cross-bars 34 and 35 respectively of the frame unit 16 (see Figs. 2 and 3) and are provided with notches 88 and 89 at the opposite ends thereof (see Fig. 9) to fit onto the upstanding edges of the auxiliary side plates 90 and 91 respectively which are bolted to the side plates 36 and 37.

A perforated plate 93 suitably bolted to the bottom of the movable frame unit 16 bridges the open spaces therebetween the bed plate 28, the cross-bar 35 and the side plates 36 and 37 to prevent any unions which may be inadvertently dropped by the operator from falling through the frame unit to the bottom of the tank 10 from which they would be difficult to retrieve.

The liquid bath in the tank 10 preferably should be of sufficient depth to completely submerge the unions 41 and 41' held in the testing mechanisms when the movable frame unit 16 is in its lowered position as shown in Figs. 1 and 11. When the frame unit 16 is in its raised position as shown in Figs. 2 and 10 the unions 41 and 41' are entirely clear of the surface of said liquid bath.

The operation of the improved testing apparatus of this invention is best understood by reference to Figs. 10 and 11 of the drawings, and is as follows: The improved union tester is actuated by air pressure from two compressed air supply pipes 100 and 101. From supply pipe 100 compressed air first passes through a hand valve 102 and an automatic air line lubricator 103 and after passing through this lubricator, part of the compressed air continues along pipe 104 thence through a pressure regulator 105 and pipe 106 to enter a four-way foot control valve 107. The rest of the compressed air is carried off through a pipe 108 and through a pressure regulator 109 located thereon to enter a four-way hand control valve 110 at the end thereof.

Two pipes 111 and 112 lead from the four-way foot control valve 107 to the fluid pressure distributor fittings 113 and 114 and thence to each of the piston-cylinder units 42 of the testing mechanisms 40 mounted on the movable frame unit 16. Operation of the pedal 115 on the foot control valve 107 from the position indicated in broken outline in Fig. 11 to the full line position thereshown leads the compressed air into pipe 111 causing the pistons 48 in each of the piston-cylinder units 42 to move in a direction to extend the piston rods 47 from the cylinder to clamp the unions in the frame. Operation of the other pedal 116 from the position shown in full lines in Fig. 10 to that indicated in broken outline therein leads the compressed air into pipe 112 causing the pistons 48 to move in the opposite direction in their cylinders 49 to retract the piston rods 47 thereby releasing the unions from the clamping pressure.

The four-way hand control valve 110 controls the vertical motion of the movable frame unit 16. By this valve compressed air may be introduced via pipe 118 and a lateral port 118' below the piston 19 in the vertical cylinder 20 causing the movable frame unit 16 to be raised out of the liquid bath, or it may be introduced into the cylinder 20 above the piston 19 via pipe 117 and a lateral port 117' causing an opposite motion of the frame unit to submerge the unions in the bath. Pipes 117 and 118 which carry the compressed air from the hand control valve 110 to the cylinder 20 are provided with speed control valves 119 and 120 respectively to regulate the speed of the movable frame unit 16 as it is immersed in or raised from the liquid bath in the tank 10.

Compressed air for the manifold unit 71 is obtained from air supply pipe 101 and, after first passing through a pressure regulator 121, is conducted via pipe 122 to enter a normally open three-way diaphragm control valve 123. Leaving this valve as it passes via pipe 124 to enter a normally closed three-way diaphragm control valve 125 from which the compressed air is carried via pipe 126 and flexible hose 127 to the manifold unit 71. The pipes 111 and 112 leading to the distributor fittings 113 and 114 also incorporate therein flexible hose sections 128 and 129 respectively.

The normally open diaphragm control valve 123 is operated by compressed air led to it through the pipe 130 so that when the pedal 116 of the foot control valve 107 is operated to unclamp the unions 41 and 41' in the movable frame unit 16 this normally open diaphragm control valve 123 closes, as depicted in Fig. 10.

The normally closed diaphragm control valve 125 is operated by compressed air led to it through the pipe 131 so that when the hand control valve 110 is operated from the position indicated in dotted outline in Fig. 11 to the full line position thereshown so as to lower the movable frame unit 16 into the liquid bath in the tank 10 this normally closed diaphragm valve 125 opens.

In the testing operation the operator begins with the movable frame unit 16 in its raised position out of the liquid as shown in Fig. 10 with the hand and foot control valves 110 and 107 in neutral positions and the piston rods 47 of the piston-cylinder units 42 of the testing mechanisms 40 retracted. After filling all the V-notches 87 in the bar members 85 and 86 with unions 41 and 41' respectively to be tested, the operator depresses the pedal 115 of the foot control valve 107 as indicated in Fig. 11 to actuate the piston-cylinder unit 42 by fluid pressure to clamp the unions securely in place. At this point no compressed air from supply pipe 101 can reach the manifold 71 because valve 125 remains in its normally closed position as shown in Fig. 10, with the movable frame unit still in its elevated position.

The handle of the hand control valve 110 then is moved counterclockwise from a vertical or neutral position to the full line position shown in Fig. 11 to enable the compressed air in the pipe 108 to flow via pipe 117 into the cylinder 20 to lower the unions into the liquid bath in the tank 10. As the compressed air flows into pipe 117 it also finds its way down pipe 131 to the normally closed diaphragm control valve 125 and moves it into open position. Now the compressed air from supply 101 is able to reach the manifold unit 71 and from there passes into the interiors of the unions to be tested.

If, however, the operator should accidentally depress the pedal 116 of the foot control valve 107 to produce unclamping of the unions when immersed in the bath and while there is pressure in the submerged manifold, the release of compressed air, which otherwise would blow the liquid out of the tank 10, is precluded by the simultaneous application of compressed air from the pipe 106 and pipe 130 to the normally open diaphragm control valve 123. Thus if the pedal 116 of the foot control valve 107 is inadvertently operated to unclamp the unions when they are submerged, compressed air from the pipe 130 will close the normally open diaphragm control valve 123 shutting off air supply 101. At the same time the pressure is exhausted from the manifold unit 71 from the normally open valve 123. Before the unions are unclamped in their frame all air pressure in the manifold unit 71 is exhausted.

After the operator has determined whether or not any of the unions 41 and 41' leak from the presence or absence of air bubbles rising from them to the surface of the liquid (see Fig. 1), he then raises the frame by moving the handle of the hand control valve 110 clockwise from the position shown in full lines in Fig. 11 to the position indicated in broken outline in Fig. 10 whereby compressed air flows through the pipe 118 to the cylinder 20 and thereby causes an upward travel of the piston 19 and the frame unit 16 driven thereby, and since the compressed air has at this point been removed from the pipe 117 it has also been removed from pipe 131, and the normally closed diaphragm control valve 125 closes shutting off the air from the special supply pipe 101, and permitting the pressure in the manifold unit 71 to exhaust from normally closed diaphragm control valve 125.

When the frame unit 16 reaches its extreme upper limit of travel the pedal 116 of the foot control valve 107 then is depressed to unclamp the unions which are then manually removed, and the sequence of steps is repeated with a new batch of unions to be tested.

Just as air pressure in the manifold 71 would blow the liquid out of the tank if it were possible to unclamp the submerged unions when there was air pressure in the manifold unit 71 so also this manifold pressure would cause turbulence which would blow the liquid out of the tank if it were released when the movable frame unit 16 were raised out of the liquid bath. However, by the arrangement of the present invention it is impossible to have air under pressure within the manifold unit 71 when the movable frame unit 16 is raised out of the testing bath, because there is no air under pressure in pipe 117, or in pipe 131, at this time and hence the normally closed three-way diaphragm control valve 125 will remain closed by its spring as depicted in Fig. 10 and the manifold is vented at a suitable port 125' in the bottom of the valve 125.

With this improved union tester I am able to carry out the mass testing of a large number of unions for each immersion in the bath, quickly and easily and in a highly efficient manner due to the use of fluid pressure actuated means for raising and lowering the movable frame unit and the unions to be tested into and out of the liquid bath, rather than moving them manually. In the preferred form of my device here shown in the drawings I am able to test simultaneously ten unions at a single immersion, but it is to be understood, of course, that a union testing apparatus embodying the features of my invention is not limited to this number of unions under test since it would be made to accommodate any desired number of unions.

My improved union tester also has the advantage of being readily adapted to test unions of different sizes. In changing from one size to another it is only necessary to lift out the V-notched bar members 85 and 86 and replace them with others having the notches 87 of a different size which will properly align and support the different sized unions with respect to the clamping mechanisms.

As a further feature, the fluid pressure actuated clamping mechanisms 40 are so arranged and able to apply sufficient clamping force to insure a firm holding of each union being tested and to avoid leakage of air pressure from the ends of the unions.

Finally, there is provided a suitable arrangement of valves and controls in the fluid pressure system which makes it impossible for the operator to unclamp the unions when there is air under pressure in the manifold unit 71 and spatter liquid out of the tank.

While I have herein shown and described a preferred embodiment of the invention particularly adapted for the testing simultaneously of a set of two unions arranged in tandem, and for use with unions of various sizes, it is to be understood that the invention is not to be limited to the specific apparatus described herein as it will be readily apparent that the invention is applicable also to the testing of a single union in the manner described above when one end of the union is held tightly pressed against a hollow gas supply member by clamping pressure applied at the other end of the union by a fluid pressure actuated clamping means. Still other adaptations and variations of the invention will be evident to those skilled in the art, without departing from the spirit of the invention or the scope of the appended claims.

What I claim is:

1. Apparatus for testing a union for leakage comprising a tank adapted to contain a liquid bath, a movable frame unit, fluid pressure operated means associated with said movable frame unit and operative to move said frame unit into and out of the liquid bath in said tank, a gas supply member carried by said frame unit and provided with an outlet for introducing pressurized gas into the interior of the union to be tested, fluid pressure actuated means carried by said frame unit and including a clamping block movable toward and from said gas supply member to clampingly hold at least one union between said block and member, means controlling the delivery of fluid pressure to said fluid pressure actuated means, means controlling the delivery of fluid pressure to said fluid pressure operated means independently of said first recited controlling means, and means responsive only to said last recited controlling means operative to control the flow of gas to said gas supply member so that as the frame unit is immersed in the liquid bath, gas flows to the gas supply member.

2. Apparatus according to claim 1 additionally including means operative to cut off the flow of gas to said gas supply member in response to operation of said first recited controlling means only to effect declamping operation of said fluid pressure actuated means.

3. Apparatus for testing unions for leakage including an open tank containing a liquid bath, a frame unit situated within the tank for relative movement into and out of the liquid bath, fluid pressure operated means for so relatively moving the frame unit, a gas supply member for introducing gas under pressure into the interior of a test union, fluid pressure actuated clamping means for sealingly clamping the union against the gas supply member independently of said fluid pressure operated means, and means for supplying gas under pressure to the interior of the test union through said gas supply member including a normally closed fluid pressure responsive valve means operable to open automatically to supply gas under pressure into the union when fluid pressure is applied to cause the frame unit to move into the liquid bath and including a second fluid pressure responsive valve means which is normally open and operable to close automatically and shut off the flow of gas to said gas supply member in response to and whenever fluid pressure is applied to cause unclamping of the test union while it is submerged.

4. Apparatus for testing a union for leakage comprising, in combination, a tank containing a liquid bath, a movable frame unit within said tank, fluid pressure operated means operatively arranged to move said frame unit to and from said liquid bath, a gas supply member on said frame unit and provided with an outlet for introducing gas under pressure into the interior of a test union through one end thereof when the union is clampingly held against said gas supply member in a gas receiving relationship with said outlet thereof, fluid pressure actuated clamping means mounted on said frame unit and movable toward and from said gas supply member for clamping the union to be tested thereagainst by endwise engagement with the union, sealing means between the ends of the test union and the adjacent gas supply member and clamping means, respectively, means for supplying fluid pressure to said fluid pressure actuated clamping means including valve means for controlling the clamping and unclamping movements of said fluid pressure actuated clamping means, means for supplying fluid pressure to said fluid pressure operated means that moves said frame unit including valve means for controlling the movement of said frame unit to and from the liquid bath, and means for supplying gas under pressure to the interior of the test union through said gas supply member including a normally closed valve means operable to open automatically and render said gas supplying means effective to supply gas under pressure into the union when fluid pressure is applied to cause the frame unit to move toward the liquid bath, and including a second valve means which is normally open and operable to close automatically and shut off the flow of gas under pressure to said gas supply member in response to and whenever fluid pressure is applied to cause unclamping of the test union while it is submerged.

5. Apparatus for testing a union for leakage comprising, in combination, a tank containing a liquid bath, a movable frame unit within said tank, fluid pressure operated means operatively arranged to move said frame unit to and from said liquid bath, a gas supply member on said frame unit and provided with an outlet for introducing gas under pressure into the interior of a test union through one end thereof when the union is clampingly held against said gas supply member in a gas receiving relationship with said outlet thereof, fluid pressure actuated clamping means mounted on said frame unit and movable toward and from said gas supply member for clamping the union to be tested thereagainst by endwise engagement with the union, sealing means between the ends of the test union and the adjacent gas supply member and clamping means, respectively, means for supplying fluid pressure to said fluid pressure actuated clamping means including selective control valve means for controlling the clamping and unclamping movements of said fluid pressure actuated clamping means, means for supplying fluid pressure to said fluid pressure operated means that moves said frame unit including selective control valve means for controlling the movement of said frame unit to and from the liquid bath, and means for supplying gas under pressure to the interior of the test union through said gas supply member including a normally closed fluid pressure responsive diaphragm valve means operable to open automatically and render said gas supplying means effective to supply gas under pressure into the union when fluid pressure is applied to cause the frame unit to move toward the liquid bath, and including a second fluid pressure responsive diaphargm valve means which is normally open and operable to close automatically and shut off the flow of gas under pressure to said gas supply member in response to and whenever fluid pressure is applied to cause unclamping of the test union while it is submerged.

6. Apparatus for testing a union for leakage comprising, in combination, an open tank containing a liquid bath, a frame unit situated within said tank for vertical movement, fluid pressure operated means operatively arranged to lower and raise said frame unit to and from said liquid bath, a gas supply member on said frame unit and provided with an outlet for introducing gas under pressure into the interior of a test union through one end thereof when the union is clampingly held against said gas supply member in a gas receiving relationship with said outlet thereof, fluid pressure actuated clamping means mounted on said frame unit and movable toward and from said gas supply member for clamping the union to be tested thereagainst by endwise engagement with the union, sealing means between the ends of the test union and the adjacent gas supply member and clamping means, respectively, means for supplying fluid pressure to said fluid pressure actuated clamping means including selective control valve means for controlling the clamping and unclamping movements of said fluid pressure actuated clamping means, means for supplying fluid pressure to said fluid pressure operated means that moves said frame unit including selective control valve means for controlling the movement of said frame unit to and from the liquid bath, and means for supplying gas under pressure to the interior of the test union through said gas supply member including a normally closed fluid pressure responsive valve means operable to open automatically and render said gas supplying means effective to supply gas under pressure into the union when fluid pressure is applied to cause the frame unit to move toward the liquid bath, and including a second fluid pressure responsive valve means which is normally open and operable to close automatically and shut off the flow of gas under pressure to said gas supply member in response to and whenever fluid pressure is applied to cause unclamping of the test union while it is submerged.

7. Apparatus for testing a union for leakage comprising, in combination, a tank containing a liquid bath, a frame unit within said tank for vertical movement therein, said frame unit including a vertically movable supporting member, said supporting member being attached at its upper end to said frame unit and having its lower portion extending exteriorly from the bottom of said tank, a piston-cylinder unit beneath said tank and operative to move said supporting member up and down, means for supplying fluid pressure to actuate said piston-cylinder unit to cause movement of said frame unit by said supporting member including selective control valve means for controlling the lowering and raising movements of said frame unit in and out of said liquid bath, a testing mechanism secured to said frame unit for immersion therewith in said liquid bath, said testing mechanism comprising a gas supply member provided with an outlet for supplying gas under pressure to the interior of a test union through an open end thereof when the union is positioned in communication with said outlet, an annular sealing pad about the outlet of said gas supply member and against which said open end of the test union is to be clamped, a second piston-cylinder unit including a clamping member carrying a sealing pad for engaging the other open end of the test union, said clamping member being positioned opposite and at a predetermined distance from said gas supply member and movable to clamp said union against the annular sealing pad thereof, means for supplying fluid pressure to actuate said second piston-cylinder unit to cause movement of said clamping member including selective control valve means for controlling the clamping and unclamping movements of said clamping member independently of the movement of said supporting member, and means for supplying gas under pressure to said gas supply member and to the interior of the test union including a normally closed valve means operable to open automatically and supply gas under pressure to said gas supply member in response to and only when fluid pressure is applied to cause lowering of the frame unit to immerse the testing mechanism thereon together with the test union clamped thereby in the testing bath.

8. Apparatus for testing unions for leakage comprising, in combination, a tank containing a liquid bath, a movable frame unit in said tank, fluid pressure operated means operatively arranged to move said frame unit to and from said liquid bath, fluid pressure actuated means carried by said frame unit and including a movable clamping member, means also carried by said frame unit and including a gas supply member for supplying gas under pressure into the interior of a test union to be clamped thereto, second and third clamping members arranged one behind the other between said first clamping member and said gas supply member, said second and third clamping members being interconnected to be movable in unison and resiliently biased to positions respectively at predetermined distances from said first clamping member and said gas supply member, said second and third clamping members being moved to secure a union between said third clamping member and said gas supply member by the thrust of said fluid pressure actuated clamping means after an initial movement of the first clamping member associated therewith clamps and secures another union between it and the second clamping member, means communicating with the interiors of said unions through said second and third clamping members for supplying gas under pressure to the interior of one union from the interior of the other union, means for supplying fluid pressure to said fluid pressure actuated clamping means including a selective control valve means to control the clamping and unclamping movements of the first clamping member, additional selective control valve means for actuating the fluid pressure operated means that moves the frame unit for controlling the movement thereof to and from said liquid bath, and means for supplying gas under pressure to said gas supply member and to the interiors of the unions including normally closed fluid pressure responsive valve means operable to open automatically and supply gas under pressure to said gas supply member and to said unions in response to and only at such times when fluid pressure is applied to cause movement of the frame unit toward the liquid bath in the tank.

9. Apparatus for testing unions for leakage comprising, in combination, an open tank containing a liquid bath, an elevatable frame unit in said tank, fluid pressure operated means operative to raise and lower said frame unit in and out of said liquid bath, fluid pressure actuated means on said frame unit and including a movable clamping member, a hollow gas supply member on said frame unit arranged for supplying gas under pressure into the interior of a test union to be clamped thereto, second and third clamping members arranged one behind the other between said first clamping member and said gas supply member, said second and third clamping members being interconnected to be movable in unison and resiliently biased to positions respectively at predetermined distances from said first clamping member and said gas supply member, said second and third clamping members being moved to secure a union between said third clamping member and said gas supply member by the thrust of said fluid pressure actuated clamping means after an initial movement of the first clamping member associated therewith clamps and secures another union between it and the second clamping member, means communicating with the interior of said unions through said second and third clamping members for supplying gas under pressure to the interior of one union from the interior of the other union, means for supplying fluid pressure to said fluid pressure actuated clamping means including a manually operated, selective control valve means to control the clamping and unclamping movements of the first clamping member, additional independently manually operated selective control valve means for actuating the fluid pressure operated means that moves the frame unit for controlling the movement thereof to and from said liquid bath, and means for supplying gas under pressure to said hollow gas supply member and to the interiors of the unions including normally closed fluid pressure responsive valve means operable to open automatically and supply gas under pressure to said gas supply member and to said unions in response to and only at such times when fluid pressure is applied to cause lowering of the frame unit in the tank.

10. Apparatus for testing unions for leakage comprising, in combination, a tank containing a liquid bath, a movable frame unit in said tank, fluid pressure operated means operatively arranged to move said frame unit to and from said liquid bath, fluid pressure actuated means carried by said frame unit and including a movable clamping member, means also carried by said frame unit and including a hollow gas supply manifold for supplying gas under pressure into the interior of a test union to be clamped thereto, second and third clamping members arranged one behind the other between said first clamping member and said gas supply member, said second and third clamping members being interconnected to be movable in unison and resiliently biased to positions respectively at predetermined distances from said first clamping member and said gas supply member, said second and third clamping members being moved to secure a union between said third clamping member and said gas supply member by the thrust of said fluid pressure actuated clamping means after an initial movement of said first clamping member associated therewith clamps and secures another union between it and the second clamping member, means communicating with the interiors of said unions through said second and third clamping members for supplying gas under pressure to the interior of one union from the interior of the other union, resilient sealing means carried by each of said clamping members and by said manifold and against which the open ends of said unions are clamped and sealed, notched union supporting members one positioned between said first and second clamping members and another situated between said third clamping member and said manifold, said notched members also being disposed below the axes of said clamping members and adapted to support temporarily in their notches the unions to be tested preliminarily to their being clamped in place, means for introducing fluid pressure to said fluid actuated means to securely clamp the test unions supported by said notched members against said resilient sealing means, and means for introducing gas under pressure into said hollow gas supply member simultaneously with the application of fluid pressure to produce movement of said frame unit toward the liquid bath in said tank.

11. Apparatus for testing unions comprising, in combination, a tank substantially filled with a liquid, a frame located within said tank for vertical movement, fluid pressure operated means connected with said frame and operative to move said frame vertically to and from the liquid in said tank, a hollow gas supply manifold secured on said frame, bearing means secured on said frame apart from said manifold, said bearing means having a bore therethrough of which one end is disposed opposite said manifold, a tubular spindle mounted in said bearing for sliding movement axially therein toward and from said manifold, clamping members at opposite ends of said spindle, spring means interposed between said bearing and one of said clamping members of said spindle and resiliently biasing said spindle away from said manifold, fluid pressure actuated means including a movable clamping body and mounted on said frame apart from said bearing in axial alignment with said spindle, said clamping body being moved by said fluid pressure actuated means toward and from one of said clamping members of said spindle for clamping a test union therebetween, an imperforate resilient pad carried by said movable clamping body, annular resilient pads one carried by each of said clamping members of said spindle and another at an outlet in said manifold, said pads serving to seal the open ends of the unions when clamped thereagainst, notched bar members positioned between said manifold and the opposing clamping member of said spindle and between said fluid pressure actuated clamping body and the opposite clamping member of said spindle, said notched bars also being disposed below the axis of said spindle and adapted to support temporarily in their notches the unions to be tested prior to their being clamped in place, means for introducing fluid pressure to said fluid pressure actuated means to securely clamp the test unions held by said bar members against said resilient pads, and means for introducing gas under pressure into said gas supply manifold simultaneously with the application of fluid pressure to produce lowering of said frame into said testing liquid.

References Cited in the file of this patent

UNITED STATES PATENTS

| | | |
|---|---|---|
| 445,706 | Stevenson | Feb. 3, 1891 |
| 1,554,637 | McKee | Sept. 22, 1925 |
| 2,398,328 | Rogers | Apr. 9, 1946 |
| 2,551,645 | Stadelman | May 8, 1951 |
| 2,631,451 | Ford et al. | Mar. 17, 1953 |
| 2,673,462 | Thompson | Mar. 30, 1954 |